United States Patent [19]

Mehadji et al.

[11] Patent Number: 5,307,431
[45] Date of Patent: Apr. 26, 1994

[54] OVERMOLDED FERRULE FOR CONNECTING FIBERS AND A METHOD FOR PREPARING THE SAME

[75] Inventors: Kada Mehadji; André Mathern, both of Lannion, France

[73] Assignee: France Telecom, France

[21] Appl. No.: 955,836

[22] Filed: Oct. 2, 1992

[30] Foreign Application Priority Data

Oct. 4, 1991 [FR] France ............... 91 12232

[51] Int. Cl.⁵ ............................................. G02B 6/38
[52] U.S. Cl. ..................................... 385/72; 264/1.5; 385/70
[58] Field of Search ............... 264/1.5; 385/66, 68, 385/70, 72, 84

[56] References Cited

U.S. PATENT DOCUMENTS

| | | | |
|---|---|---|---|
| 4,185,883 | 1/1980 | Chown et al. | 385/84 |
| 4,218,113 | 8/1980 | Uberbacher | 385/72 |
| 4,506,946 | 3/1985 | Hodge | 385/70 |
| 4,687,288 | 8/1987 | Margolin et al. | 385/84 |
| 4,867,525 | 9/1989 | DiMarco et al. | 385/84 |
| 4,929,046 | 5/1990 | Barlow | 385/72 |
| 5,042,902 | 8/1991 | Huebscher et al. | 385/72 |

FOREIGN PATENT DOCUMENTS

| | | |
|---|---|---|
| 0057828 | 1/1982 | European Pat. Off. . |
| 0272112 | 6/1988 | European Pat. Off. . |
| 0354173 | 2/1990 | European Pat. Off. ............ 385/68 |
| 0396313 | 4/1990 | European Pat. Off. . |
| 0441696 | 2/1991 | European Pat. Off. . |
| 3429626 | 8/1984 | Fed. Rep. of Germany . |

OTHER PUBLICATIONS

Patent Abstracts of Japan, vol. 10, No. 322 (P-511)(2378) Oct. 31, 1986 & JP-A-61 128 212 (NTT) Jun. 16, 1986.

Primary Examiner—John D. Lee
Attorney, Agent, or Firm—Blakely, Sokoloff, Taylor & Zafman

[57] ABSTRACT

A device for connecting optical fibers, the device being of the type comprising a ferrule possessing a capillary channel of section that is substantially complementary to the optical fibers to be connected and that is suitable for receiving the respective ends of two optical fibers, wherein the device further includes a body overmolded on the ferrule and defining two entry cones centered on the capillary channel and opening out respectively into the two axial ends of the capillary channel.

30 Claims, 5 Drawing Sheets

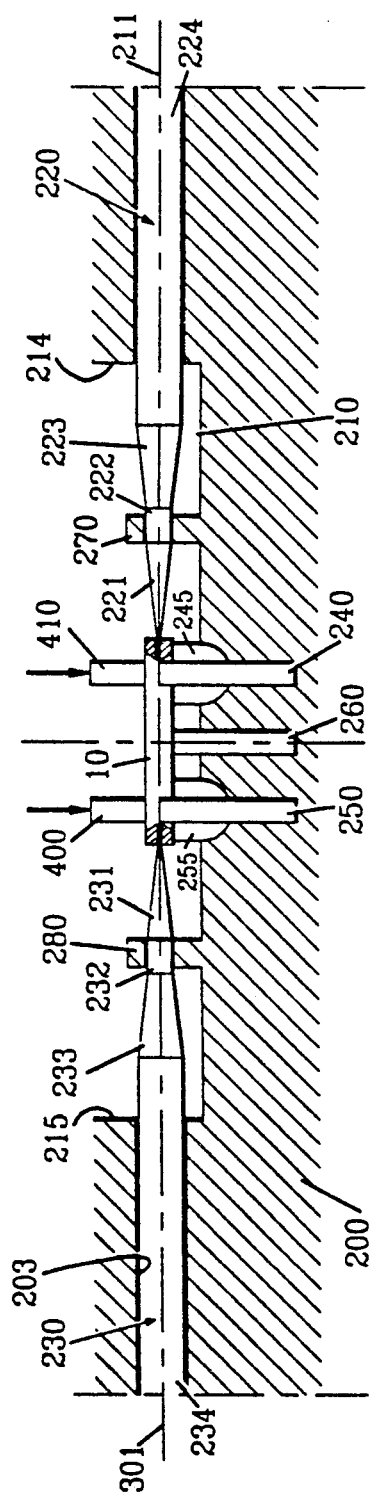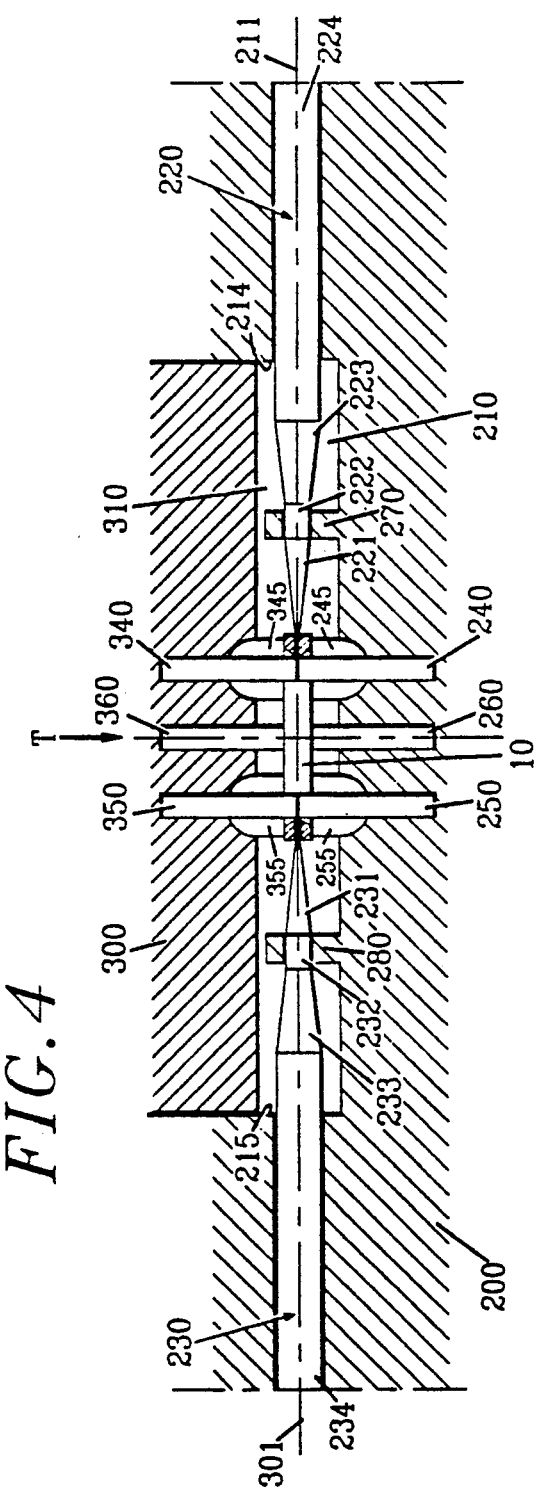

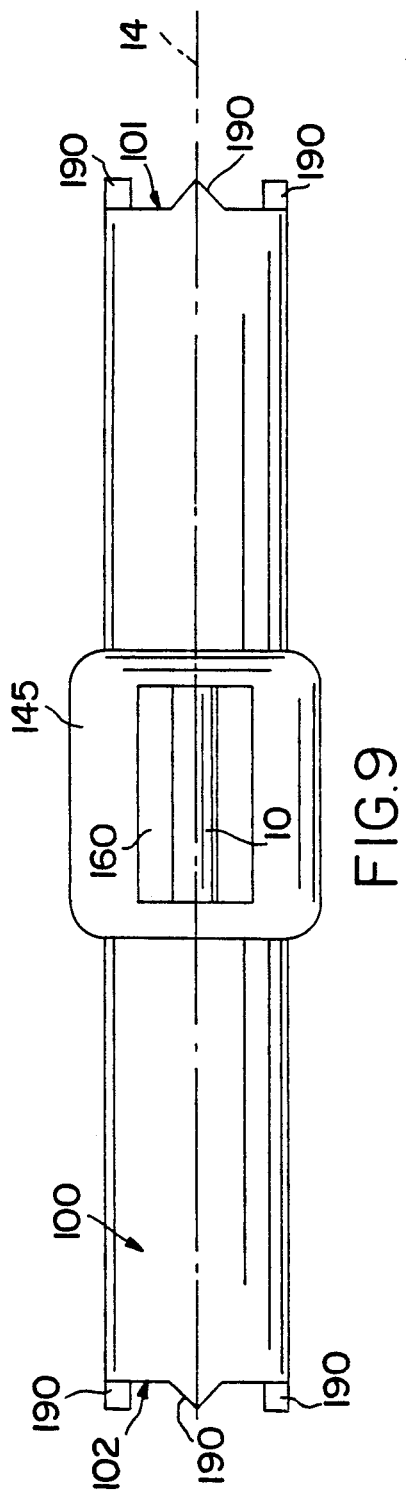
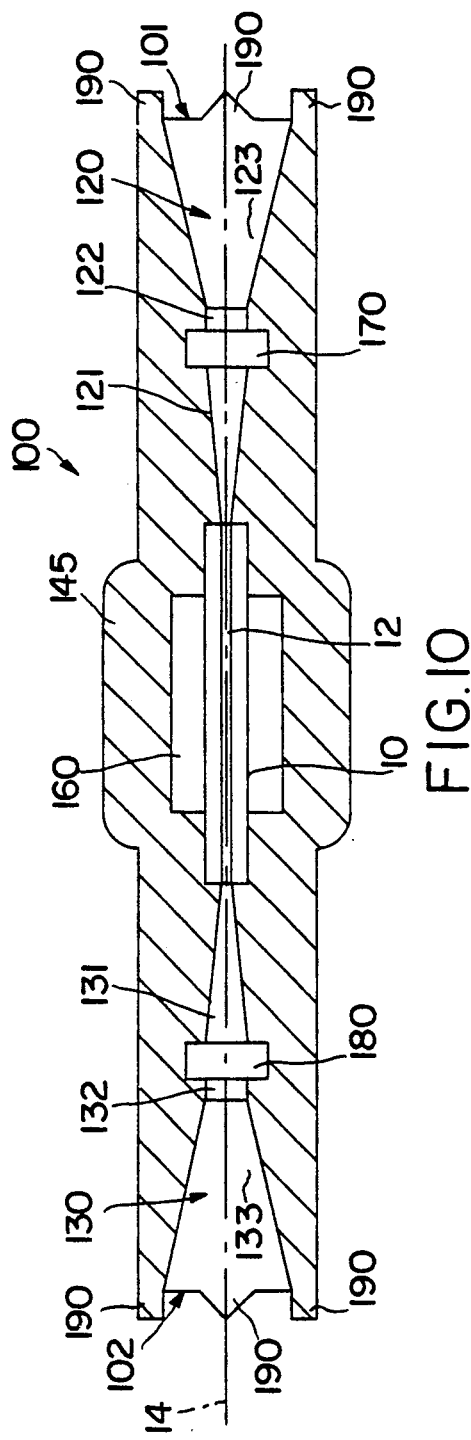

OVERMOLDED FERRULE FOR CONNECTING FIBERS AND A METHOD FOR PREPARING THE SAME

The present invention relates to the field of devices for connecting optical fibers.

More precisely, the present invention relates to a device for connecting optical fibers, the device being of the type comprising a ferrule having a capillary channel suitable for receiving the ends of the optical fibers to be connected.

BACKGROUND OF THE INVENTION

Various connection devices comprising a ferrule with a capillary channel have already been proposed.

Document FR-A-2 657 865, for example, describes an optical fiber connection endpiece that includes a capillary channel together with an entry cone formed by machining in each endpiece. To connect two optical fibers together, they are placed in respective ones of the above-mentioned endpieces, with engagement of the fibers in the endpieces being facilitated by the entry cones. Thereafter, the optical fibers are secured in their respective endpieces by means of a polymerizable adhesive, and the two endpieces are assembled together and brought into alignment in a complementary sleeve.

Variant endpieces having capillary channels associated with entry cones suitable for receiving respective optical fibers are described in Documents WO-A-87 01464 and JP-A-58 9116, for example.

Those known optical fiber connection devices, each comprising two ferrules associated with respective optical fibers do not give full satisfaction.

In particular, the alignment of the two ferrules in a complementary sleeve is not always sufficiently accurate to obtain satisfactory alignment of the fibers, and as a result non-negligible losses occur in the coupling of light energy.

Document U.S. Pat. No. 3,944,328 describes another variant of a ferrule, made by molding, e.g. using epoxy resin, and including a capillary channel that is provided at both ends with an entry cone. A singe ferrule can thus receive respective ends of two optical fibers. That technique avoids any need to subsequently align two ferrules each receiving one fiber.

Nevertheless, the technique described in Document U.S. Pat. No. 3,944,328 does not give full satisfaction, either. When a ferrule is made by molding, it is not always possible to obtain a satisfactory capillary channel, i.e. a capillary channel having sufficient dimensional accuracy to obtain satisfactory alignment of the fibers.

Document EP-A-0 272 112 describes an optical fiber connector that comprises a ferrule and a heat-shrink cover that contains a sealant. The sealant is confined on the ferrule 2 when the cover 8 is shrunk. However, in that system, where the confinement material is pressed against the ferrule by the heat-shrink cover, it is not possible to define very accurate entry cones for the optical fibers, i.e. entry cones that coincide exactly with the capillary channel of the ferrule.

The main object of the present invention is to eliminate the drawbacks of the prior art.

SUMMARY OF THE INVENTION

According to the present invention, this object is achieved by a device for connecting optical fibers, the device being of the type comprising a ferrule possessing a capillary channel of section that is substantially complementary to the optical fibers to be connected and that is suitable for receiving the respective ends of two optical fibers, wherein the device further includes a body overmolded on the ferrule and defining two entry cones centered on the capillary channel and opening out respectively into the two axial ends of the capillary channel.

The connection device of the present invention achieves optimum alignment of the optical fibers because it uses a ferrule having an accurate capillary channel, and because it avoids any need for subsequent alignment of two ferrules.

According to an advantageous feature of the present invention, the overmolded body includes at least one radial opening that opens out onto the ferrule over the zone where the optical fibers are connected together, and the ferrule is made of a material that is optically transparent.

According to another advantageous feature of the present invention, the body overmolded on the ferrule includes projections at its axial ends. As explained below, such projections prevent the fibers being crushed in use.

The present invention also provides a method of preparing the above-specified connection device.

According to an important feature, said method comprises the steps consisting in:
  making a ferrule having a capillary channel of section substantially complementary to the optical fibers to be connected together and suitable for receiving the respective ends of two optical fibers;
  placing the ferrule in the cavity of a mold on at least one cradle projecting into said cavity;
  displacing two conical needles in alignment with the axis of the capillary channel of the ferrule in axial translation so as to engage the tips of the needles in the ends of the ferrule;
  closing the mold; and
  injecting thermoplastic material into the mold cavity to form the overmolded body on the ferrule.

BRIEF DESCRIPTION OF THE DRAWINGS

Embodiments of the invention are described by way of example with reference to the accompanying drawings, in which:

FIGS. 2, 3 and 4 are vertical axial section views through a mold shown in various successive steps of the method of the invention for preparing a connection device of the invention;

FIG. 9 is a plan view of a variant embodiment of a connection device of the present invention;

FIG. 10 is a horizontal axial section view through the FIG. 9 embodiment of a connection device of the present invention.

DETAILED DESCRIPTION

Figure 1:
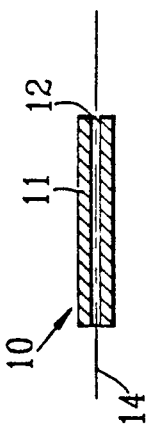
FIG. 1 is a diagrammatic longitudinal axial section through a ferrule having a capillary channel and in accordance with the present invention.

The connection device of the present invention essentially comprises a ferrule 10 having a capillary channel and a body 100 overmolded on the ferrule 10.

The ferrule 10 comprises a rectilinear sleeve 11 possessing a rectilinear capillary channel 12 centered on an axis 14. The outside surface of the ferrule 10 is preferably a circular cylinder about the axis 14. The right cross-section of the capillary channel 12 is substantially complementary to the outside surface of bare fibers to be connected. In other words, the diameter of the capillary channel 12 is slightly greater than the diameter of the bare fibers to be connected, so as to be able to receive them, while still being very close to the diameter of said fibers so as to limit any play thereof within the ferrule 10. Thus, when the ends of two optical fibers to be connected are engaged in the ferrule 10, excellent alignment is obtained of the optical fibers to be connected, and consequently very low loss is obtained in light energy coupling.

By way of example, for a bare optical fiber having a diameter of 125 μm, it is possible to use a capillary channel 12 having a diameter of 126 μm.

The ferrule 10 is preferably made by drawing down tubes of silica. The technique of making capillary ferrules by drawing silica tubes is known to the person skilled in the art and is therefore not described in detail below. By way of example, reference may usefully be made to Document FR-A-2 657 865. Nevertheless, it is recalled that such ferrules have very good dimensional accuracy. In addition, such ferrules based on silica tubes possess good optical transparency, thereby making it easy to verify visually that the fibers are properly installed, and in particular that the ends thereof are in contact, as described below.

Typical dimensions for the ferrule 10 may be for its internal capillary channel 12 to have a diameter of 125 μm, for its outside diameter to be 1.2 mm, and for its length to be about 10 mm, but such dimensions are not limiting.

Although making the ferrule 10 out of silica is greatly preferred in the context of the present invention, the invention is not limited to using that material in particular. In the context of the present invention, the ferrules 10 could equally well be based on a ceramic or on alumina, for example.

The body 100 overmolded on the ferrule 10 is preferably made of a thermoplastic material. Most advantageously, it is made of polyphenylenesulfone, such as the material sold under the trade name Ryton by Philips Petroleum. The thermoplastic material may contain a filler.

The body 100 surrounds the ferrule 10 and extends it symmetrically beyond each of the axial ends thereof. The body 100 is thus an elongate body centered on the axis 14 of the ferrule 10. Its outside surface is generally a circularly symmetrical body of revolution about said axis 14.

The body 100 defines two entry cones 120 and 130 centered on the axis 14 of the ferrule 10 and opening out into respective axial ends of the capillary channel 12 of the ferrule 10.

The entry cones 120, 130 are designed to form perfect junctions with the respective ends of the capillary channel 12. They thus facilitate insertion of the optical fibers into the capillary channel 12.

Figure 5:
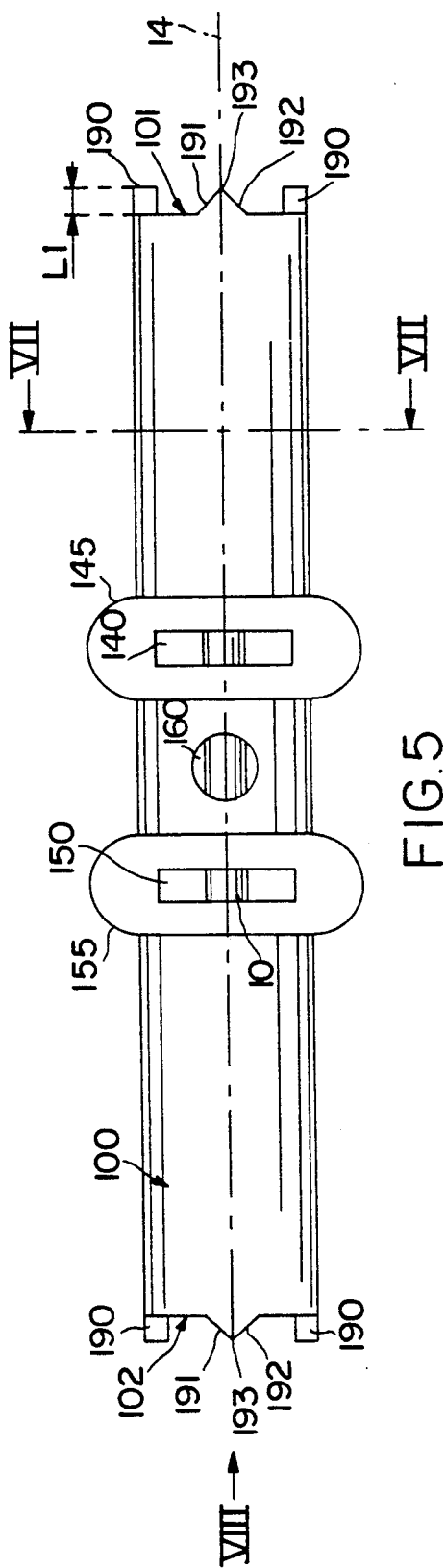
FIG. 5 is a plan view of a connection device of the present invention.
Figure 6:
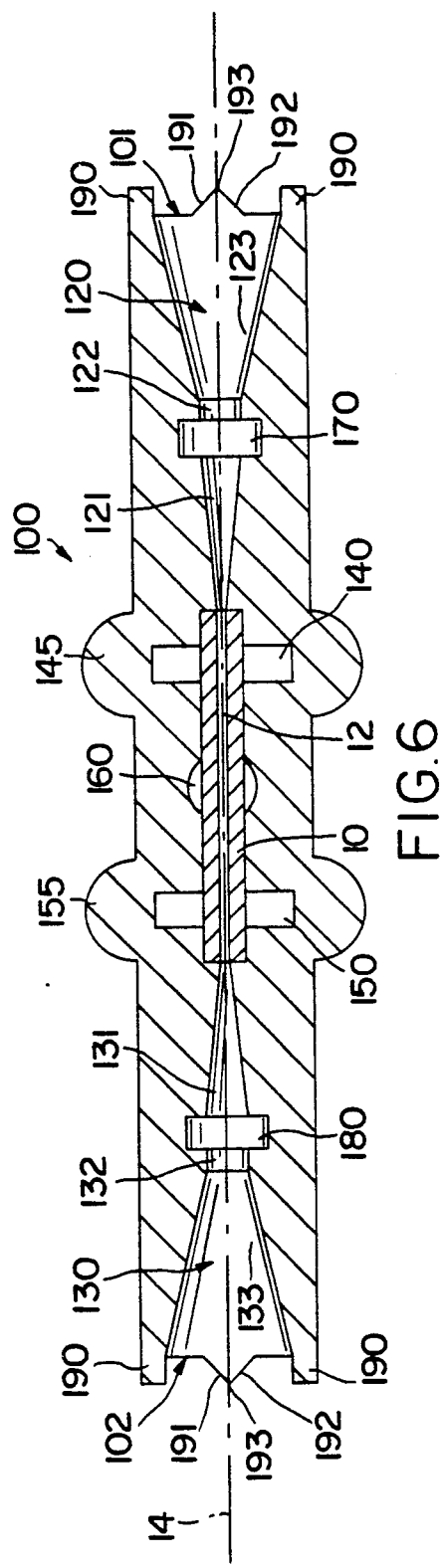
FIG. 6 is an axial section view through the FIG. 5 connection device, on a section plane referenced VI-VI in FIG. 8.

In the preferred embodiment shown in the accompanying figures, the connection device includes at least one opening 160 that is formed radially through the body 100 and that opens out to the ferrule 10 over the zone where the optical fibers come into contact. As shown in FIGS. 5 and 6, the opening 160 is preferably formed halfway along the body 100. The opening 160 makes it possible to examine the connection zone of said fibers so as to check that their ends are in contact. The opening 160 preferably passes diametrically right through the body 100 so as to enable the connection zone to be illuminated from one end and observed from the other end thereof.

Figure 8:
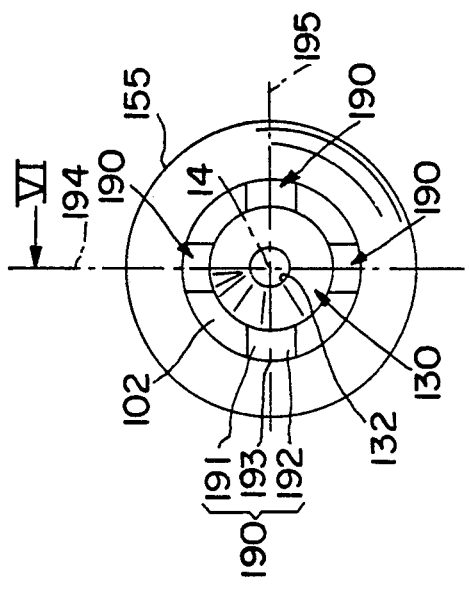
FIG. 8 is an end view of the same connection device as seen looking along the direction VIII in FIG. 5.
Figure 11:
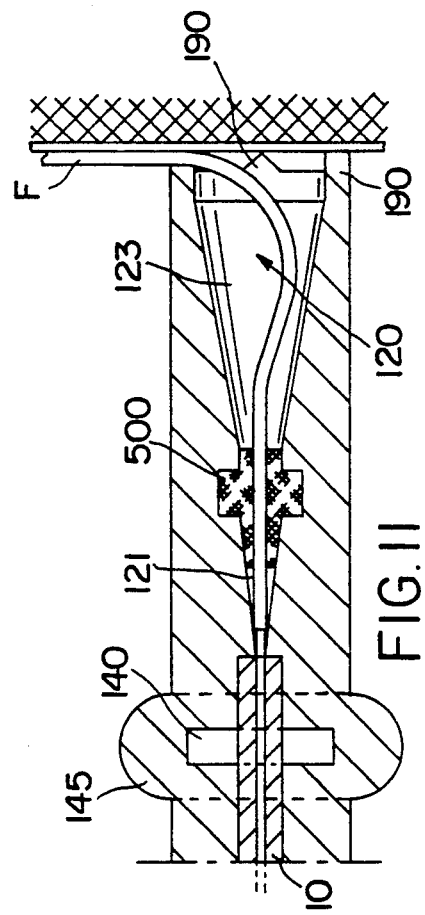
FIG. 11 is a half view in longitudinal axial section through a connection device of the present invention fitted with optical fibers.

In addition, as shown in FIGS. 5, 6, and 8, the body 100 preferably includes projections 190 on its end faces 101 and 102 that are normal to the axis 14. It may be provided with four projections 190 uniformly distributed around the axis 14 at each end, for example. The axial length L1 of the projections 190 is not less than the diameter of the optical fibers used, including their coverings. The projections 190 thus prevent the optical fibers being crushed, even if the connection device has one of its ends bearing against a surface, as shown in FIG. 11, by way of example.

Naturally, the configuration of the projections 190 may be implemented in numerous different ways.

As shown in the accompanying figures, and in particular in FIGS. 5 and 6, each projection 190 is preferably delimited by two plane flanks 191 and 192 disposed symmetrically about an axial plane including the axis 14 of the ferrule 10 and tapering away from the corresponding end face 101 and 102 of the body. The flanks 191 and 192 meet at a straight line 193 that extends radially relative to the axis 14. These lines 193 form the tips of the projections 190.

Thus, when four projections 190 are provided on each end of the connection device, and are uniformly distributed around the axis 14 of the ferrule, then two projections 190 are delimited by respective pairs of plane flanks 191 and 192 disposed symmetrically about a first axial plane 194 including the axis 14 of the ferrule 10, and the other two projections 190 are similarly delimited by pairs of flanks 191 and 192 disposed symmetrically about a second axial plane 195 including the axis 14 of the ferrule 10. This second plane of symmetry 195 is orthogonal to the first plane of symmetry 194.

The tips 193 of the various projections 190 provided at either end of the body 100 are coplanar and are situated in a plane that extends perpendicularly to the axis 14. As a result, when the body 100 is stood up on one of its ends, it is supported by a support surface via the above-mentioned straight lines 193, and as shown in FIG. 11.

The projections 190 each comprising two symmetrical flanks 191 and 192 thus appear as triangular teeth when seen sideways-on, as can be seen in FIGS. 5 and 6.

The method of preparing the connection device of the present invention is now described, with further details of the structure of the device appearing from that description.

The first step of the method consists in making the ferrule 10 together with its capillary channel 12. As mentioned above, the ferrule 10 may be obtained by any technique known to the person skilled in the art, for example the technique taught in Document FR-A-2 657 865.

Figure 2:
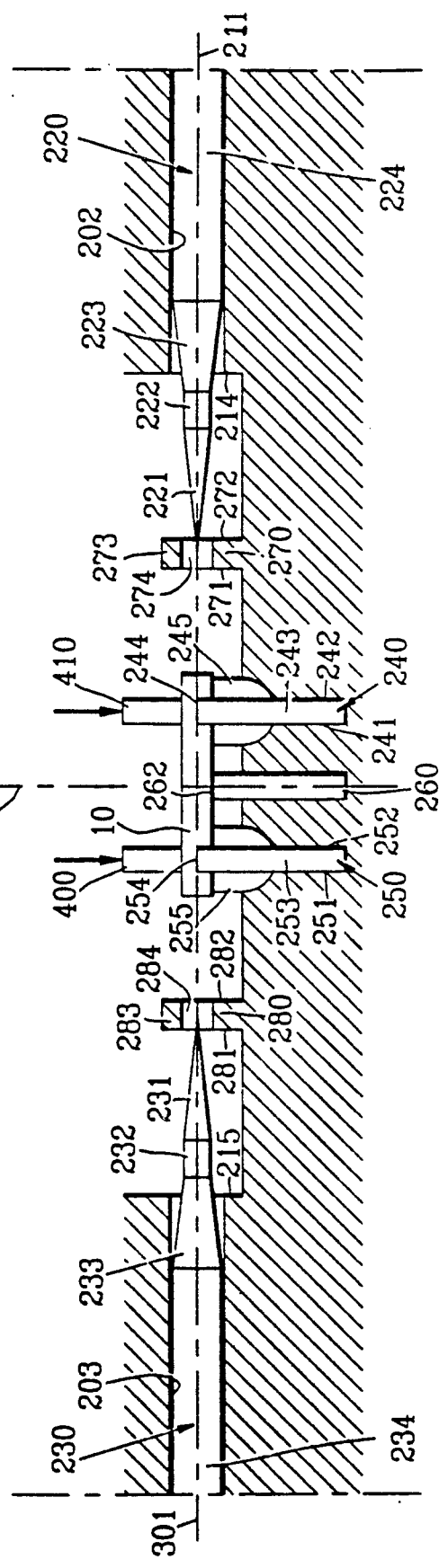

As shown in FIGS. 2 to 4, the ferrule 10 is then placed in a mold for forming the body 100. The mold comprises a stationary bottom shell 200 and a movable top shell 300. The top shell 300 is movable in translation in a direction T perpendicular to the join plane 301. The join plane 301 is perpendicular to the plane of FIGS. 2 to 4, and the translation direction T is parallel thereto.

More precisely, the ferrule 10 is placed in the bottom shell 200 of the mold. This shell 200 defines a cavity 210 that is complementary to a longitudinal half of the outside surface of the body 100. For example, for a body 100 that is generally cylindrical about the axis 14, the cavity 210 is a semicylindrical cavity centered on an axis 211.

In use, the axis 211 coincides with the axis 14 of the ferrule 10. The axis 211 also lies in the join plane 301.

Naturally, if the body 100 is polygonal in right cross-section, then the cavity 210 is of complementary polygonal section.

In the embodiment shown in FIGS. 2 to 4, the ferrule 10 rests on two vertical cradles 240 and 250 that project into the cavity 210. The two cradles 240 and 250 are situated at equal distances from the middle of the cavity 210 in the lengthwise direction. The cradles 240 and 250 are delimited by two main plane surfaces 241, 242, and 251, 252 that extend orthogonally to the axis 14, by two plane lateral faces 243 and 253 that are parallel to each other and orthogonal to the join plane 301 of the mold, and by a top surface 244 or 254 which is concave and complementary to the outside surface of the ferrule 10. The surfaces 244 and 254 are advantageously circularly cylindrical surfaces around the axis 211 of the cavity 210, thereby enabling said axis 211 to coincide with the axis 14 of the ferrule when the ferrule is placed on the cradles 240 and 250.

The ferrule 10 is then held on the cradles 240 and 250 by means of fingers 400 and 410 that are lowered onto the ferrule 10 and that rest thereagainst.

The mold 200 is also fitted with two identical needles 220 and 230 centered on the axis 211 of the mold. The general shape of the needles 220 and 230 is that of an elongate tapering cone pointing towards the center of the cavity 210. The needles 220 and 230 are placed in bores 202 and 203 formed in the shell 200 and centered on the axis 211 such that the needles 220 and 230 are guided in translation along the axis 211. The special shape of the tips of the needles 220 and 230 is adapted to the desired shape for the entry cones 120 and 130.

In the embodiment shown in the accompanying figures, each needle 220 and 230 comprises in succession, going from its tip towards its base: a conical portion 221 or 231; a circularly cylindrical portion 222 or 232; a flared frustoconical portion 223 or 233; and a circularly cylindrical portion 224 or 234.

The diameter of the intermediate cylindrical portion 222 or 232 is equal to the large base diameter of the conical portion 221 or 231, and to the smaller diameter of the frustoconical portion 223 or 233. The base cylindrical portion 224 or 234 has the same diameter as the larger diameter of the frustoconical portion 223 or 233.

The above-specified needles 220 and 230 shape entry cones 120 and 130 that comprise, in succession, going from the center of the body 100 towards its ends: a conical portion 121 or 131; a portion that is circularly cylindrical 122 or 132; and a flared frustoconical portion 123, 133.

As can be seen by comparing FIGS. 2 and 3, after the ferrule 10 has been rested on the cradles 240 and 250, and after the ferrule 10 has been secured in position by the fingers 400 and 410, the needles 220 and 230 are moved in translation towards each other along the axis 211 so that the tips of the conical portions 221 and 231 thereof become engaged in respective ends of the capillary channel 12 of the ferrule 10, each over a controlled distance.

More precisely, two small walls 270 and 280 are preferably provided respectively between the cradle 240 and the corresponding axial end 214 of the cavity 210, and between the cradle 250 and the end 215.

The walls 270 and 280 project into the cavity 210. They are delimited essentially by two main faces 271, 272, or 281, 282 that are plane and orthogonal to the axis 211, by two plane flanks that are parallel to each other and to the axis 211, while being orthogonal to the join plane 301, and by a convex semicylindrical top 273 or 283 centered on the axis 211. The distance between the above-mentioned flanks of the walls 270 and 280 is equal to the diameter of the cylindrical surfaces 273 and 283, and is greater than the cylindrical sections 222 and 232 of the needles 220 and 230, while being smaller than the right cross-section of the cavity 210. The walls 270 and 280 form openings 170 and 180 in the entry cones 120 and 130 of the part 100. These openings 170 and 180 are suitable for receiving respective masses of adhesive for securing the optical fibers in the connection device.

In other words, the walls 270 and 280 delimit respective grooves in the body 100 extending into the inside periphery of each of the entry cones 120 and 130, said grooves opening out radially to the outside of the body 100.

Each of the walls 270 and 280 is provided with a through bore 274 or 284 centered on the axis 211 and complementary in section to the cylindrical portions 222 or 232 of the needles 220 and 230.

The bottom shell 200 of the mold further includes a central stand 260 halfway along the mold and projecting perpendicularly to the join plane 301.

For example, the stand 260 may be circular in section, being centered on an axis 261 perpendicular to the join plane 301 and of diameter greater than the diameter of the ferrule 10. The top of the stand 260 is delimited by a concave cylindrical cap 262 centered on the axis 211. The cap 262 is complementary to the outside surface of the ferrule 10. Thus, as mentioned above, the stand 260 forms a radial opening 160 in the body 100, which opening opens out to the ferrule 10 facing the zone where the fibers meet each other, thereby enabling them to be examined, providing the ferrule 10 is made of transparent material.

This disposition is important insofar as the gap between the ends of the fibers must generally be less than 10 μm in order to avoid degrading the connection.

The fiber ends may be observed by any of the simple optical means known to the person skilled in the art.

After the fingers 400 and 410 have been withdrawn, the top shell 300 of the mold is placed on the bottom shell 200 to close the mold cavity.

The top shell 300 defines a cavity 310 which is symmetrical to the cavity 210 of the bottom mold 200. The cavity 310 of the top shell 300 is thus preferably semi-cylindrical and includes two cradles 340 and 350 that are symmetrical to the cradles 240 and 250, together with a stand 360 that is symmetrical to the stand 260. In contrast, it is preferable for the top shell 300 of the mold to have no walls comparable to the above-described walls 270 and 280.

The cradles 240, 250, 340, and 350 that bear against the ferrule 10 define two pairs of windows 140 and 150 that open out on the ferrule through the body 100. When a stand 260 is provided on the shell 200 and a stand 360 is provided on the shell 300, two further diametrically opposite openings 160 are provided through the body 100 as described above, one for illumination purposes and the other for observation purposes. If only one stand 260 or 360 is provided in the mold, then only one observation opening 160 is obtained.

In order to ensure that the material constituting the body 100 is of sufficient mechanical strength in spite of the cradles 240, 250 and 340, 350, the cavities 210 and 310 defined in the mold shells 200 and 300 are preferably provided with semi-toroidal enlargements 245, 255, 345, and 355 around the above-mentioned cradles 250, 250, 340, and 350. These semi-toroidal enlargements 245, 255, 345, and 355 in the mold cavities 210 and 310 give rise to thickenings 145 and 155 on the outside of the body 100 as can be seen in FIGS. 5 and 6, for example.

In addition, the mold cavity defined by the shells 200 and 300 possesses chambers at its axial ends 214 and 215 that are complementary to the projections 190 required at the ends of the body 100. These chambers have two planes of symmetry that coincide with the above-mentioned planes of symmetry 194 and 195. One of these planes of symmetry corresponds to the join plane 301. The above-mentioned second plane of symmetry is orthogonal to the join plane 301.

Figure 7:
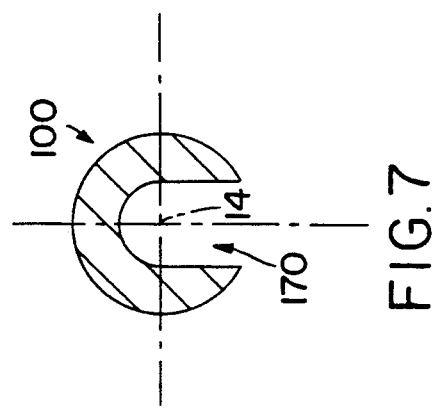
FIG. 7 is a cross-section through the same connection device on a section plane referenced VII—VII in FIG. 5.

To connect together two optical fibers F using the connection device of the invention, it suffices to engage the ends of the fibers F in respective entry cones 120 and 130 and to push the optical fibers F into the capillary channels 12 so as to bring their ends into contact. Contact between the optical fibers F is verified via the windows 160. The optical fibers F can then be secured in the connection device by means of adhesive 500 inserted via the openings 170 and 180 (see FIGS. 7 and 11).

Because of the above-mentioned dispositions, there is no danger of the fibers F breaking at the ends of the connection device. The above-mentioned dispositions enable the fibers to move with considerable freedom without being damaged. As shown in FIG. 11, the connection device can even have one of its ends pressed against a bearing surface without damaging the corresponding fiber F. In particular, because of the projections 190, the optical fiber F need never be crushed by the end of the connection device.

FIGS. 9 and 10 corresponding to above-described FIGS. 5 and 6 respectively show a variant embodiment of the connection device of the present invention obtained by using a mold in which the two cradles 240 and 250 and the stand 260 as described above are replaced by a single piece located in the center of the mold cavity. In which case, the single central cradle that receives the ferrule 10 during the molding operation is also used for forming the observation opening 160. In other words the windows 140, and 150, and the observation opening 160 are then combined.

The present invention is applicable to connecting optical fibers that are monomode or that are multimode.

In a particular embodiment, given by way of non-limiting example:
- the outside diameter of the body 100 is 5 mm;
- the axial length L1 of the projections 190 is about 0.6 mm;
- the total length of the body 100 is 34 mm;
- the larger diameter of the frustoconical portion 123 or 133 or the entry cones 120 and 130 is 4 mm;
- the cone angle of the frustoconical portions 123 and 133 of the entry cones 120 and 130 is 30°;
- the diameter of the cylindrical portion 122 or 132 of the entry cones 120 and 130 is 1 mm;
- the cone angle of the conical portions 121 or 131 of the entry cones 120 and 130 is 120°;
- the axial length of the cylindrical portion 122 or 132 of the entry cones is 1.5 mm; and
- the outside diameter of the thickenings 145 and 155 is 8 mm.

The resin used for forming the body 100 has mechanical properties close to tho= =of steels. The body 100 is advantageously molded under pressure.

Naturally, the present invention is not limited to the particular embodiments described above, but it extends to any variant coming within the spirit of the invention.

We claim:

1. A device for connecting optical fibers comprising:
    a ferrule in form of a cylindrical rectilinear sleeve possessing a central and rectilinear capillary channel of cylindrical section having a diameter which is complementary to the diameter of the outside surface of optical fibers to be connected and that is suitable for receiving the respective ends of two optical fibers; and
    a thermoplastic body overmolded on the ferrule and defining two entry cones centered on the capillary channel and opening out respectively into the two axial ends of the capillary channel with a diameter equal to the diameter of said capillary channel.

2. A device according to claim 1, wherein the overmolded body includes at least one radial opening that opens out onto the ferrule over the zone where the optical fibers are connected together, and the ferrule is made of a material that is optically transparent.

3. A device according to claim 2, wherein the overmolded body includes at least two diametrically-opposite radial openings opening out onto the ferrule.

4. A device according to claim 1, wherein the overmolded body includes projections extending axially from its axial ends.

5. A device according to claim 4, wherein the overmolded body includes four projections uniformly distributed around the axis of the body, at each end.

6. A device according to claim 4, wherein the axial length of the projections is greater than the diameter of the fibers in use when within their coverings.

7. A device according to claim 1, wherein the overmolded body possesses two openings which open out into respective ones of the entry cones.

8. A device according to claim 7, wherein each of the openings receives a mass of adhesive for securing the optical fibers.

9. A device according to claim 7, wherein the openings form respective grooves in the peripheries of the entry cones.

10. A device according to claim 1, wherein the overmolded body is made of a thermoplastic material, preferably polyphenylene-sulfone.

11. A device according to claim 1, wherein the ferrule is made of silica.

12. A device according to claim 1, wherein the ferrule is made of ceramic or of alumina.

13. A method of preparing a device according to claim 1, wherein the method comprises the following steps:
    making a ferrule in form of a cylindrical rectilinear sleeve having a central, rectilinear capillary channel of cylindrical section having a diameter which is complementary to the diameter of the outside surface of optical fibers to be connected together and suitable for receiving the respective ends of two optical fibers;
    placing the ferrule in the cavity of a mold on at least one cradle projecting into said cavity;
    displacing two conical needles in alignment with the axis of the capillary channel of the ferrule in axial translation so as to engage the tips of the needles in the ends of the channel of the ferrule, in engagement with the ends of said channel;
    closing the mold; and
    injecting thermoplastic material into the mold cavity to form the overmolded body on the ferrule with two entry cones centered on the capillary channel and opening out respectively into the two axial ends of the capillary channel with a diameter equal to the diameter of said capillary channel.

14. A method according to claim 13, wherein the mold possesses two cradles and a stand disposed between the cradles and serving to form an observation opening in the overmolded body, which opening opens out onto the ferrule.

15. A method according to claim 13, wherein the mold possesses a cradle which also forms an observation opening in the overmolded body, which opening opens out onto the ferrule.

16. A method according to claim 13, wherein the mold possesses two small walls forming respective openings in each of the entry cones.

17. A device for connecting optical fibers comprising:
    a ferrule in form of an optically transparent cylindrical rectilinear sleeve possessing a central and rectilinear capillary channel of cylindrical section having a diameter which is complementary to the diameter of the outside surface of optical fibers to be connected and that is suitable for receiving the respective ends of two optical fibers; and
    a thermoplastic body overmolded on the ferrule and defining two entry cones centered on the capillary channel and opening out respectively into the two axial ends of the capillary channel with a diameter equal to the diameter of said capillary channel, said overmolded body including at least one radial opening that opens out onto the ferrule over the zone where the optical fibers are connected together.

18. A device according to claim 17, wherein the overmolded body includes at least two diametrically-opposite radial openings opening out onto the ferrule.

19. A device according to claim 17, wherein the overmolded body includes projections extending axially from its axial ends, the axial length of the projections being greater than the diameter of the fibers in use when within their coverings.

20. A device according to claim 17, wherein the overmolded body possesses two openings which open out into respective ones of the entry cones.

21. A device according to claim 20, wherein each of the openings receives a mass of adhesive for securing the optical fibers.

22. A device for connecting optical fibers comprising:
    a ferrule in form of a cylindrical rectilinear sleeve possessing a central and rectilinear capillary channel of cylindrical section having a diameter which is complementary to the diameter of the outside surface of optical fibers to be connected and that is suitable for receiving the respective ends of two optical fibers; and
    a thermoplastic body overmolded on the ferrule and defining two entry cones centered on the capillary channel and opening out respectively into the two axial ends of the capillary channel with a diameter equal to the diameter of said capillary channel wherein the overmolded body possesses two openings which open out into respective ones of the entry cones and each of the openings receives a mass of adhesive for securing the optical fibers.

23. A device according to claim 22, wherein the overmolded body includes at least one radial opening that opens out onto the ferrule over the zone where the optical fibers are connected together, and the ferrule is made of a material that is optically transparent.

24. A device according to claim 23, wherein the overmolded body includes at least two diametrically-opposite openings opening out on the ferrule.

25. A device according to claim 22, wherein the overmolded body includes projections extending axially from its axial ends, the axial length of the projections being greater than the diameter of the fibers in use when within their coverings.

26. A device for connecting optical fibers comprising:
    a ferrule in form of a cylindrical rectilinear sleeve possessing a central and rectilinear capillary channel of cylindrical section having a diameter which is complementary to the diameter of the outside surface of optical fibers to be connected and that is suitable for receiving the respective ends of two optical fibers; and
    a thermoplastic body overmolded on the ferrule and defining two entry cones centered on the capillary channel and opening out respectively into the two axial ends of the capillary channel with a diameter equal to the diameter of said capillary channel, wherein the overmolded body includes projections extending axially from its axial ends, the axial length of the projection being greater than the diameter of the fibers in use when within their coverings.

27. A device according to claim 26, wherein the overmolded body includes at least one radial opening that opens out onto the ferrule over the zone where the optical fibers are connected together, and the ferrule is made of a material that is optimally transparent.

28. A device according to claim 27, wherein the overmolded body includes at least two diametrically-opposite radial openings opening out onto the ferrule.

29. A device according to claim 26, wherein the overmolded body possesses two openings which open out into respective ones of the entry cones and each of the openings receives a mass of adhesive for securing the optical fibers.

30. A device for connecting optical fibers comprising:

a ferrule in form of an optically transparent cylindrical rectilinear sleeve possessing a central and rectilinear capillary channel of cylindrical section having a diameter which is complementary to the diameter of the outside surface of optical fibers to be connected and that is suitable for receiving the respective ends of two optical fibers; and a thermoplastic body overmolded on the ferrule and defining two entry cones centered on the capillary channel and opening out respectively into the two axial ends of the capillary channel with a diameter equal to the diameter of said capillary channel, said overmolded body including at least two diametrically-opposite radial openings opening out onto the ferrule over the zone where the optical fibers are connected together, said overmolded body including also projections extending axially from its axial ends, the axial length of the projections being greater than the diameter of the fibers in use when within their coverings, and wherein the overmolded body further possesses two openings which open out into respective ones of the entry cones and which receive a mass of adhesive for securing the optical fibers.

* * * * *

UNITED STATES PATENT AND TRADEMARK OFFICE
CERTIFICATE OF CORRECTION

PATENT NO. : 5,307,431
DATED : April 26, 1994
INVENTOR(S) : Mehadji et al.

It is certified that error appears in the above-identified patent and that said Letters Patent is hereby corrected as shown below:

In column 8 at line 24 delete "tho = = of"
insert --those of--.

Signed and Sealed this

Seventeenth Day of October, 1995

Attest:

BRUCE LEHMAN

Attesting Officer    Commissioner of Patents and Trademarks